United States Patent [19]
Harris et al.

[11] 3,857,779
[45] Dec. 31, 1974

[54] ELECTRIC DISCHARGE METAL CONVERTER

[76] Inventors: Paul M. Harris, 2401 Shadow Hill Dr., Riverside, Calif. 92506; Shelby D. Adamson, 764 E. 23rd St., San Bernardino, Calif. 92404

[22] Filed: Nov. 3, 1971

[21] Appl. No.: 195,422

[52] U.S. Cl. .......................... 250/544, 204/324
[51] Int. Cl. ........................ B23p 1/02, B01k 3/00
[58] Field of Search .......... 204/325, 326, 199, 323, 204/324, 327, 328

[56] References Cited
UNITED STATES PATENTS

| | | | |
|---|---|---|---|
| 537,005 | 4/1895 | Burton | 204/325 |
| 709,868 | 9/1902 | Bradley et al. | 204/326 |
| 894,547 | 7/1908 | Steinmetz | 204/326 |
| 991,174 | 5/1911 | Schonherr et al. | 204/325 |
| 1,744,173 | 1/1930 | Longhi | 204/325 |

*Primary Examiner*—T. Tufariello
*Attorney, Agent, or Firm*—Georges A. Maxwell

[57] ABSTRACT

A metal converter comprising an annular, vertical, open-ended body of dielectric material with a plurality of circumferentially spaced radially inwardly disposed anode contacts, a grounded, conductive rotor rotatably driven in the body with its side in spaced relationship from the anode contacts and carrying a plurality of circumferentially spaced radially extending cathode contacts to bridge the annulus between the rotor and the body and shiftable into and out of engagement with the anode contacts, a direct current power supply connected with the anode contacts and ore and water supplies to establish and conduct a slurry of ore and water into the body above the rotor. Said converter operable to establish electron flow between the contacts to ionize the ore, and generate electric arcs which subject the ore to ultra violet radiation and to reduction and smelting temperatures. Said arcs generating ozone to combine with the water and sulphur dioxide gas generated as a result of heat reduction of sulphides in the ore to change the sulphur dioxide oxide gases to sulphuric acid and other acids and liquids entrained in the materials discharged by the structure.

10 Claims, 4 Drawing Figures

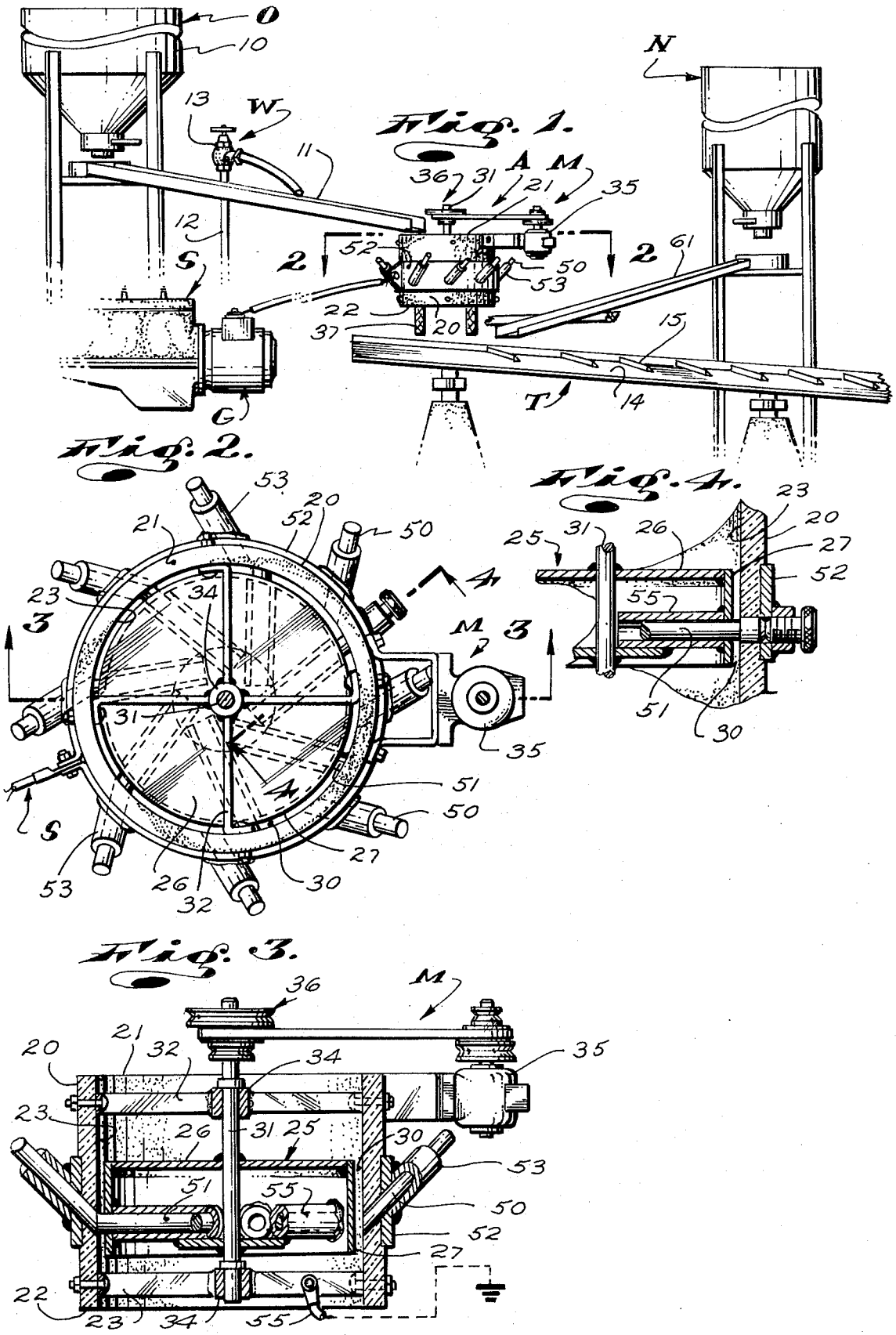

ELECTRIC DISCHARGE METAL CONVERTER

This invention has to do with a novel metal converter and is more particularly concerned with a means to convert and separate metals from the ore and related gangue in which they are found.

It is an object and feature of our invention to convert metal ore into metal by novel electrical means to thereby avoid and/or eliminate the principle shortcomings found in other methods of converting and/or extracting metals from ore, such as by smelting and chemical leaching.

In the course of converting ore into metal by smelting, leaching and by those electrical processes provided by the prior art considerably dangerous and/or damaging by products are generated which pollute the environment. For example, in all commonly practiced methods of converting ore to metal, the negative radicals in the ore are oxidized and are converted into undesirable pollutants. In the case of copper ore, the negative radical copper sulphide is oxidized and sulphur dioxide gas ($SO_2$) is generated. The sulphur dioxide gas is commonly discharged into the atmosphere to pollute the same. When in the atmosphere, the noted gas combines with the water ($H_2O$) and with ozone ($O_2$) in the atmosphere, which combination make sulphuric acid ($H_2SO_4$) and/or other sulphur acids. The acids thus established precipitate from the atmosphere to pollute and do irreparable harm and damage to much of that which they come into contact.

As a result of the great harm to the environment caused by the indiscriminate discharge of waste in the converting or ores to metals, as now practiced, both federal and state legislation has been passed, or is under study for enactment, to stop, limit and/or control the discharge of waste in the metal reduction art. In the copper reduction industry, for example, legislation in a number of states has been enacted to prohibit the discharge of more than 10 percent of the sulphur oxide gases generated into the atmosphere. As a result of the above, all those in the copper reduction industry are presently engaged in emergency programs, the purpose of which are to attempt to meet the standards or requirements set forth by the noted legislation. These programs represent major undertakings and many millions of dollars have been allocated by each of the major copper producers in furtherance thereof.

As best as can be determined, the above noted programs involve systems and means to be related to existing smelters and the like, to collect and treat the sulphurdioxide gas to render it safe. It has been anticipated by the industry that no practical means will be found which will be more than 75 percent to 80 percent effective and that the standards or requirements of 90 percent efficiency which have been established in some states is unattainable.

An object and feature of our invention is to provide a metal converting means wherein the ore to be converted to metal is milled and mixed with water to establish a slurry and the slurry is subjected to ozone generating electric arcs as the ore is converted to metal, whereby, in the case of converting copper ore into copper, the sulphur oxide gases are scrubbed in and with the water ($H_2O$) and the ozone ($O_2$) to convert the sulphur oxides into sulphuric acid ($H_2SO_4$) and/or other sulphur acids which are carried from the converter by the gangue discharged thereby and which can be neutralized by introduction of an alkaline material, such as limestone, to the gangue, thereby completely eliminating the discharge of sulphur dioxide, as well as other gases.

It is well known that certain metals and/or their ores, when in an aqueous solution and subjected to ultraviolet radiation will precipitate out of solution in a solid metallic state.

It is an object and feature of our invention to provide a novel metal converting means of the character referred to wherein the ore being acted upon is subjected to intense ultraviolet radiation generated by an electric arc or arcs which radiation serves to convert the metals of the ores to a readily precipitable metallic state.

It is well known that the molecules of metal when subjected to an electron bombardment will become ionized and freed from their adjacent surrounding materials or matrix and that they will remain as free ions until they pick up their missing electrons, are rendered neutral and returned to their metallic state.

It is an object and feature of our invention to provide a novel metal converter of the character referred to above which is such that the metal atoms in the ore are ionized to free them from their matrix and so that when they become neutral molecules they are in a free state.

It is well-known that when materials are ionized by an electron field flowing between anodic and cathodic structures, the positive charged ions drive toward and impinge upon the cathode structure where they become neutral. In the case of electroletic deposition of metals, as in electroplating, where temperatures encountered are proper, the metals collect on the cathode structures. If the temperatures at the cathode structure are sufficiently great, the metals collected therein fuse and weld together and are sufficiently molten to flow from engagement on the cathode structure.

An object and feature of our invention is to provide a metal converter of the character referred to wherein cathode structures are provided upon which ionized metal molecules collect to become neutral and which generates sufficient heat to fuse and weld the metals molecules together and put the welded metal in a sufficiently molten state so that it flows from engagement on or with the cathode structure.

In laboratory tests, it has been established that sufficient heat can be generated in and through a mass of dry or moistened ore by an electric arc to effect smelting, but in such tests excessive noxious and dangerous gases are generated, the gangue is melted and incapsulates the metal in a vitrous matrix and the current demands are excessive. Further, an effective way or manner to continuously treat large quantities of ore in such a manner has not been conceived.

The converting of ore to metal by electrolitic processes is old and well known. The shortcoming to be found in such processes, where lower voltage, amperage and temperatures are required, resides in the fact that they have proven to be extremely slow, are costly to operate and are not effective to separate and collect metals held captive and incapsulated in non-metallic matrix materials.

It is an object and feature of our invention to provide a novel means of the character referred to which is such that a large volume of ore, in an aqueous slurry can be advantageously acted upon by electric arcs to convert the ore to metal and without melting of the non-metallic materials of the ore so as to create a vitrous slag with and about the metal.

It is an object and feature of our invention to subject a cool aqueous slurry of water and ore to sudden intense heat of electric arcs which cause the ore to fracture, crack and craze in such a manner as to liberate and free metallic and non-metallic materials in the ore from each other.

Yet another object and feature of our invention is to provide a metal converter of the character referred to which is extremely simple in form, inexpensive to make, operate and maintain and which is highly effective and dependable in operation.

The foregoing and other objects and features of our invention will be fully understood from the following detailed description of the typical preferred form and carrying out of our invention, throughout which description reference is made to the accompanying drawings, in which:

FIG. 1 is a side elevational view of our new converter, showing it related to other means and apparatus;

FIG. 2 is a plan view of our converter taken substantially as indicated by line 2—2 on FIG. 1;

FIG. 3 is a sectional view taken as indicated by line 3—3 on FIG. 2; and

FIG. 4 is a sectional view taken as indicated by line 4—4 on FIG. 2.

Referring to FIG. 1 of the drawings, our converter A is shown related to a suitable ore supply O, a water supply W and a concentrating means T. The structure related to our converter can, as shown, further include neutralizing means N.

The ore supply O can be of any suitable form and is, for the purpose of this disclosure, shown as including a bin or hopper 10 in which milled ore is deposited and from which the ore is dispensed and an elongate inclined flum or chute 11 extending from the hopper 10 to the converter A and adapted to conduct the ore discharged from the hopper into the converter.

The ore is preferably milled to a granule size less than that which will pass through a 100 mesh screen.

The water supply W can be any suitable supply of water and is shown as including a water delivery pipe 12 with a suitable shut off and flow control valve 13. The water supply is shown related to the chute 11 of the means O so that the water supplied is discharged into the chute to mix with the ore therein and so that the water and ore is deposited in the converter in a slurry.

The concentrating means T is a means operable to separate heavy metal particals from those lighter non-metallic materials associated with metal ores and which is commonly referred to as gangue. The means T is related to the converter, to receive the metal and gangue flowing therefrom and in the case illustrated is a conventional, elongate, inclined, oscillating and/or vibrating concentration table with a flat top surface 14 with suitable riffles 15 and the like thereon.

The art of concentrating free metal from its related gang, by concentrating means, such as referred to above is well-known in the art and is such that further illustration and detailed consideration of the concentrating means can and will be dispensed with. It will suffice to note and state that any suitable concentrating means can be advantageously used in conjunction with our new converter.

The converter A that we provide includes an elongate, vertical tubular body 20 with an upper open receiving end 21 and a lower discharge end 22. The body is established of a dielectric or non-conductive material and has a longitudinal extending cylindrical bore 23. In practice, the body 20 can be advantageously established by a length of concrete or Transite pipe.

The converter A next includes an elongate vertical rotor 25 having a flat, horizontal, imperforate top wall 26 and a vertical, cylindrical side wall 27. The rotor is less in axial or vertical extent than the body, is less in diametric extent than the bore of the body and is arranged concentrically within the body with the side wall 27 thereof in predetermined spaced relationship from the bore 23 to define a vertically extending ore conducting annulus 30.

The rotor has a central vertical shaft 31 projecting from its upper and lower ends and rotatably engaged with upper and lower spider support means 32 and 33 carried by the body, adjacent the upper and lower ends of the rotor, by suitable bearing means 34.

The upper end of the shaft 31 projects upwardly from its related bearing means 34 and spider support means 32 and connects with suitable drive means M operable to rotate the rotor in and relative to the body.

The drive means M can be of any suitable form and design and is shown as including an electric drive motor 35 mounted on or near one side of the body 20 and a variable speed belt and pully or chain and sprocket drive assembly 36 between the shaft 31 and the drive shaft of the motor.

The chute 11 of the means O discharges the slurry of ore and water onto the top wall 26 of the rotor near the center thereof and so that as the rotor is rotated the slurry is caused to flow and spread circumferentially and radially outwardly on the top wall and is discharged or flows into the upper end of the annulus 30 in an even, well-distributed manner thereabout.

The annulus 30 is preferably about one-eighth inch wide and is such that the slurry of ore and water is closely contained between the fixed bore of the body and the circumferentially moving side wall of the rotor. As a result of the above, and since the slurry is under no appreciable head of pressure, it is moved circumferentially and downwardly through the annulus at a limited and controllable rate.

The lower discharge end of the body of the converter is open and is shown engaged on or with and supported by a pair of support beams 37 extending across the upstream or receiving end of the concentrating means or table T.

The converter A next includes a plurality of circumferentially spaced anode contacts 50 carried by the body, disposed radially inwardly at the bore 23 of the body and opposing the rotor and a plurality of circumferentially spaced cathode contacts 51 carried by the rotor to project radially outwardly therefrom and moveable into and out of contact engagement with the anode contacts as the rotor is rotated within the body.

The several anode contacts are connected with a common direct current power supply S. The power supply can be of any suitable design or form and is, in the case illustrated, a direct current generating means such as engine-driven generator G such as is commonly provided for arc welding. The generator G is connected with a conductor band 52 engaged about the exterior of the body. The band has a plurality of contact carrier tubes 53 fixed thereto and carried thereby. The tubes project radially inwardly through the wall of the body and slidably carry the annode contacts 50. The contacts 50 are preferably in the form of elongate carbon rods slidably engaged through the tubes 53. In practice, the tubes 53 are open at both their ends, are inclined upwardly and outwardly and are pitched circumferentially with their inner ends disposed toward the direction of rotation of the rotor. The contact rods 50 are originally of considerable longitudinal extent and project outwardly from the outer ends of their related tubes.

With the above relationship of parts, the rods advance inwardly through their tubes by gravity or by mechanical means and are pitched so that in the event they project inwardly from the bore of the body and into the path of the contacts 51 a shear angle between the contacts 50 and 51 is established which tends to urge the contacts 50 back or outwardly, without breaking off of the inner ends of the contacts 50.

The cathode contacts 51 are preferably elongate radially extending carbon rods. The cathode rods or contacts are slidably engaged and carried by contact carriers 55 in the rotor, which carriers are in the form of elongate, horizontal, substantially radially extending tubes within the rotor and have outer open ends extending through and opening at the outer surface of the side wall of the rotor. The rods 51 are slidably engaged in their related carrier tubes and are moved radially outwardly therein and therefrom, to bridge the annulus 30, by centrifugal force, as the rotor rotates.

In practice, the carrier tubes 55 are pitched circumferentially counter to the direction of rotation of the rotor and so that a shear angle, with the contacts 50 is established whereby the contacts 50 and 51 will shift and ride one over the other in the event the contacts 50 shift into the annulus 30.

It will be noted that if the noted pitch of the contacts 50 is 30° and the pitch of the contacts 51 is 30°, the shear angle therebetween would be 60° and such that the sought after ability of the contacts to ride over and by each other, without damage to the contact rods, would be assured.

The rotor is constructed of metal and is suitably grounded, as at 55.

The number or contacts 50 is different from the number of contacts 51, by one (1), so that, by virtue of the Vernier effect or principle, at no time is direct contact between more than one anode contact and one cathode contact possible; thus assuring no reduction of power between the contacting pair of contacts due to more than one pair of contacts being in contact at any one time.

In practice, the current supplied by the power supply can be from 20 volts to 200 volts and from 50 ampers to 500 ampers at point of contact. By reason of the Vernier principle, it is advisable that direct current be used as direct contact between power supply and ground will be broken between each anode and cathode contact. In the event alternating current is used, it will be apparent that if contact between the power supply and ground is broken in or at the annulus 30 of the converter, extremely dangerous conditions could exist.

In operation, the flow of ore and water into the converter and rotation of the rotor is commenced. The direct current is then applied to the conductor band 52. During contact between contacts 51 and 52 and as each contact 51 moves out of engagement with a contact 50, an arc is established and is drawn therebetween, circumferentially in the annulus 30 and through the slurry of ore and water therein. At about that time when the above noted arc breaks or terminates, electron flow between that contact 51 and the next contact 50 is initiated and an arc is established therebetween, through the slurry and circumferentially through the annulus and the slurry until that contact 51 engages the said next contact 50.

As a result of the above, and as a result of the numbers and spacing of the contacts 50 and 51 and the noted Vernier effect obtained, there exists a substantially constant electron flow circumferentially of the annulus 30 and through the ore and water slurry with resulting ionizing of the ore. Also and further, there is a substantially constant circumferential progression of heat, light (ultra violet) and ozone generating arcs in and about the annulus and the slurry of ore and water which act upon the ore to convert the ore to metal and which converts the sulphur dioxide gases into any of the sulphur acids to be carried away by the water and gangue.

With the converter that we provide, the metal is discharged with the water and the gangue in the form of ovoid beads or metal granules ranging in size from about 500 mesh to one-sixteenth inch, which particle sizes are easily and conveniently concentrated or separated from the water and gangue by any of the well known forms of concentrating tables and the like.

The neutralizing means that N provided is adapted to neutralize any acid generated in the converter and in the case illustrated includes a source 60 of lime, limestone or other alkaline material and a distributor 61 to distribute that material onto the discharge of the converter at the receiving end of the concentrator T. The alkaline or neutralizing material mixes with the discharge of the converter and neutralizes the acid therein.

In practice, the neutralizing material can be liquid, solid or a slurry of liquids and solids and may be sufficiently reactive with the acids in the converter discharge to create a foam which carries with it the light gangue and from which the heavier metal particles freely fall or precipitate, thereby greatly enhancing the effectiveness and speed of concentrating the metals produced.

Having described but one typical preferred form and carrying out of our invention, we do not wish to be limited to the specific details herein set forth but wish to reserve to outselves any modifications or variations which may appear to those skilled in the art and which fall within the scope of the following claims.

We claim:

1. A metal converter comprising an elongate vertical dielectric body with open upper and lower ends and a vertical flow passage therethrough to continously receive and conduct a slurry of water and ore, a plurality of anode contacts carried by the body in a common plane normal to the axis of the flow passage and in spaced relationship thereabout and disposed inwardly toward said axis, a direct current power supply connected with the anode contacts, a flow directing and grounded conductor structure within the flow passage in spaced relationship with the body and anode contacts to direct the slurry in close proximity to the anode contacts and having a plurality of cathode contacts in a common plane with the anode contacts and disposed radially outward relative to said axis and adapted to direct electron flow from the anode contacts to the conductor structure and to support electric arcs with and between the anode and cathode contacts when in spaced relationship therewith whereby the ore in the flow passage and directed by the contacts is converted to metal by the arcs between the contacts and through the slurry.

2. A structure as set forth in claim 1 wherein the flow directing and grounded conductor is rotatable about the axis of the flow passage whereby the relative spacing of the anode and cathode contacts is varied upon rotation of the conductor structure.

3. A structure as set forth in claim 1 wherein the flow directing and grounded conductor structure is rotatable and said cathode contacts are shiftable into and out of engagement with the anode contacts and the relative spacing of said anode and cathode contacts is increased and decreased as the cathode contacts move from engagement with each anode contact and toward engagement with the next anode contact.

4. A structure as set forth in claim 3 wherein the number of anode and cathode contacts is dissimilar and the spacing of said contacts about the said axis is such that only one anode contact and one cathode contact are in contacting engagement with each other at any one time as said conductor structure rotates.

5. A structure as set forth in claim 1 wherein the body is an elongate vertically extending tubular part with a cylindrical bore established of dielectric material, said anode contacts extend through circumferentially spaced openings in the body and are connected together and with the power supply by a conductor band extending about the exterior of the body, said flow directing and grounded conductor structure includes a metal rotor member with a flat top wall and a vertical cylindrical side wall rotatably supported in the body, said cathode contacts being carried by the rotor member in circumferential spaced relationship thereabout and shiftably substantially radially relative thereto to engage said bore and the anode contacts, said side wall and said bore defining an annulus to control the rate of flow of said slurry and to contain said slurry in predetermined proximity with and about the contacts.

6. A structure as set forth in claim 5 including drive means to rotate the rotor, ore and water supply means to direct the slurry into the upper end of the body, and means below the body to receive the metal and the gangue discharged from the body.

7. A structure as set forth in claim 6 wherein the number and circumferential spacing of the anode contacts is dissimilar with the number and circumferential spacing of the cathode contacts whereby, only one anode contact engages one cathode contact at any one time as the conductor structure rotates.

8. A structure as set forth in claim 7 wherein the anode contacts are elongate carbon rods slidably engaged in tubular carriers carried by the band and project into the openings in the side of the body, said cathode contacts are elongate carbon rods slidably engaged in tubular carriers carried by said rotor.

9. A structure as set forth in claim 8 wherein said anode carriers and contacts are inclined upwardly and radially outwardly and are pitched circumferentially in the direction in which the rotor rotates.

10. A structure as set forth in claim 9 wherein the cathode carriers and contacts are pitched circumferentially counter to the direction of rotation of the rotor.

* * * * *